UNITED STATES PATENT OFFICE.

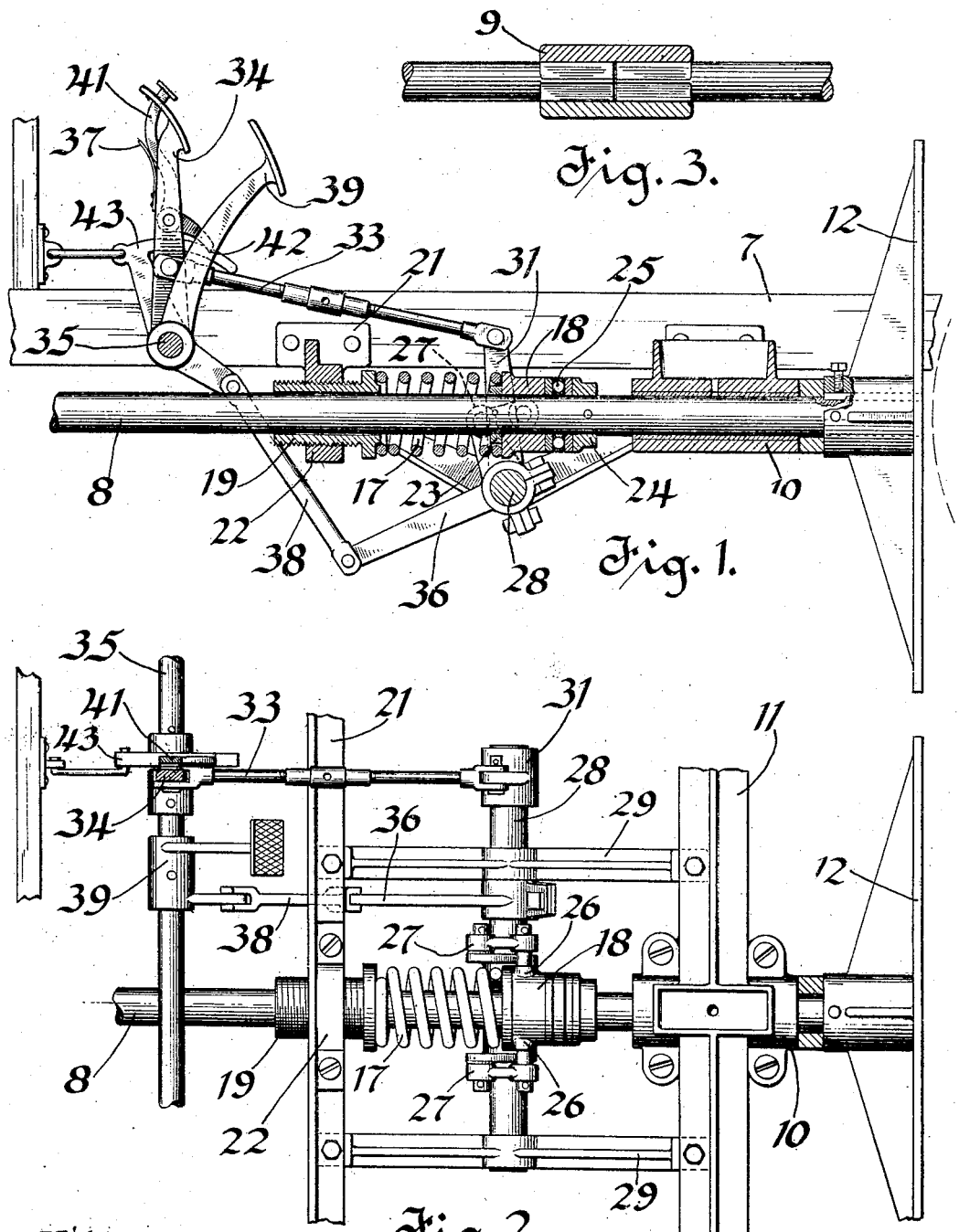

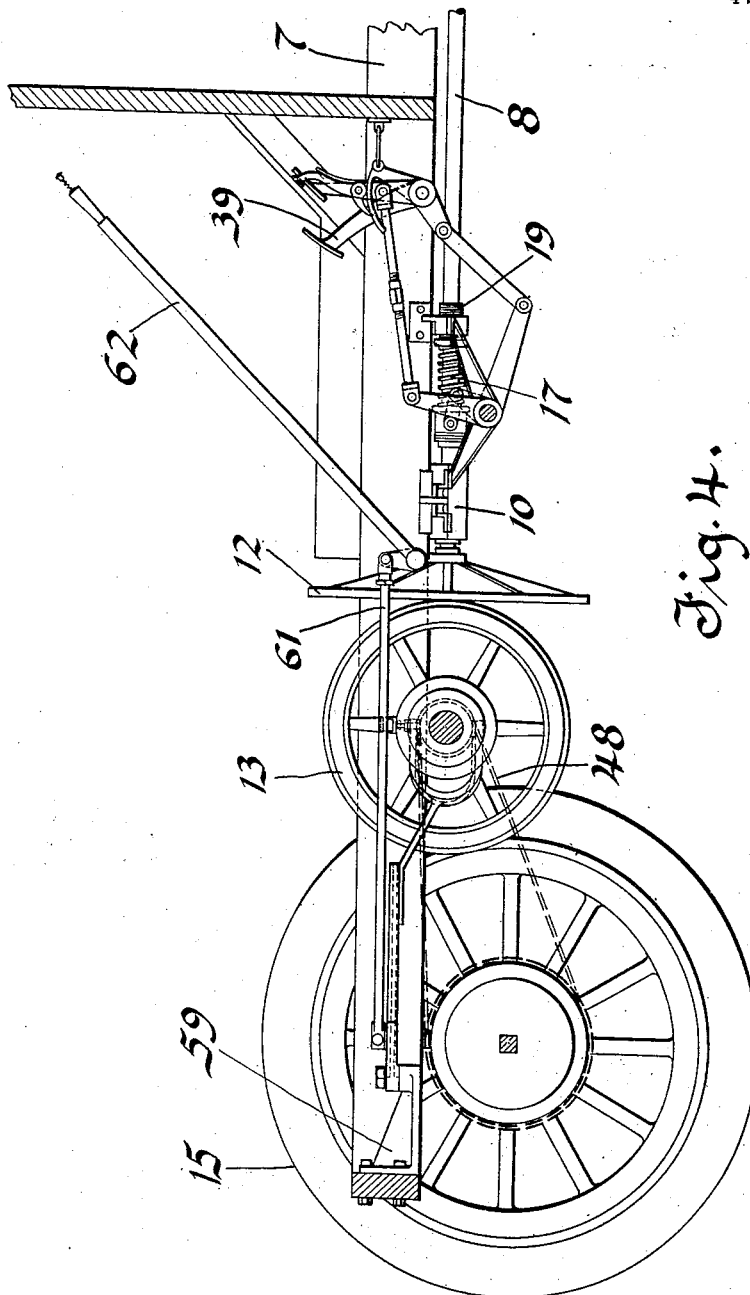

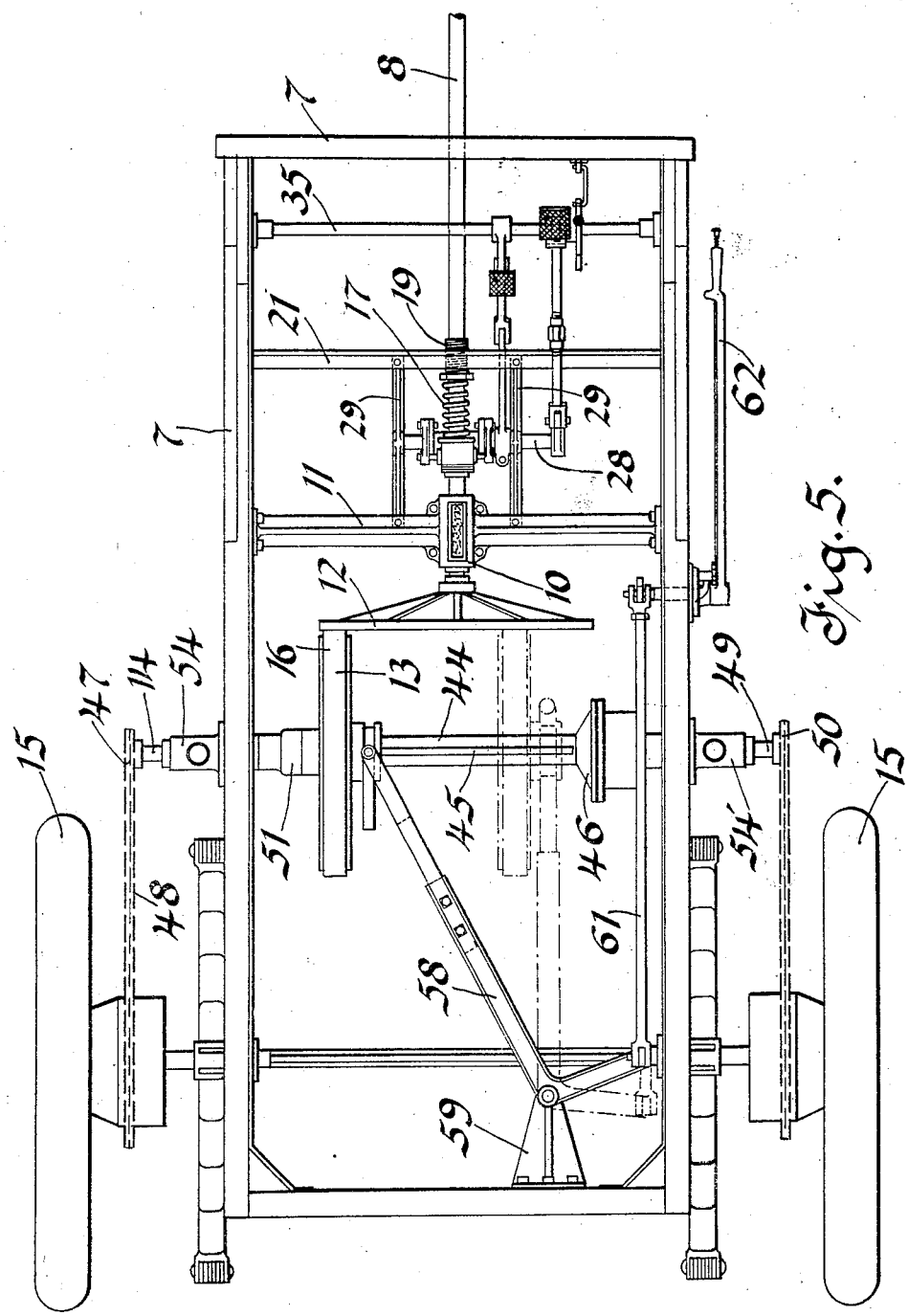

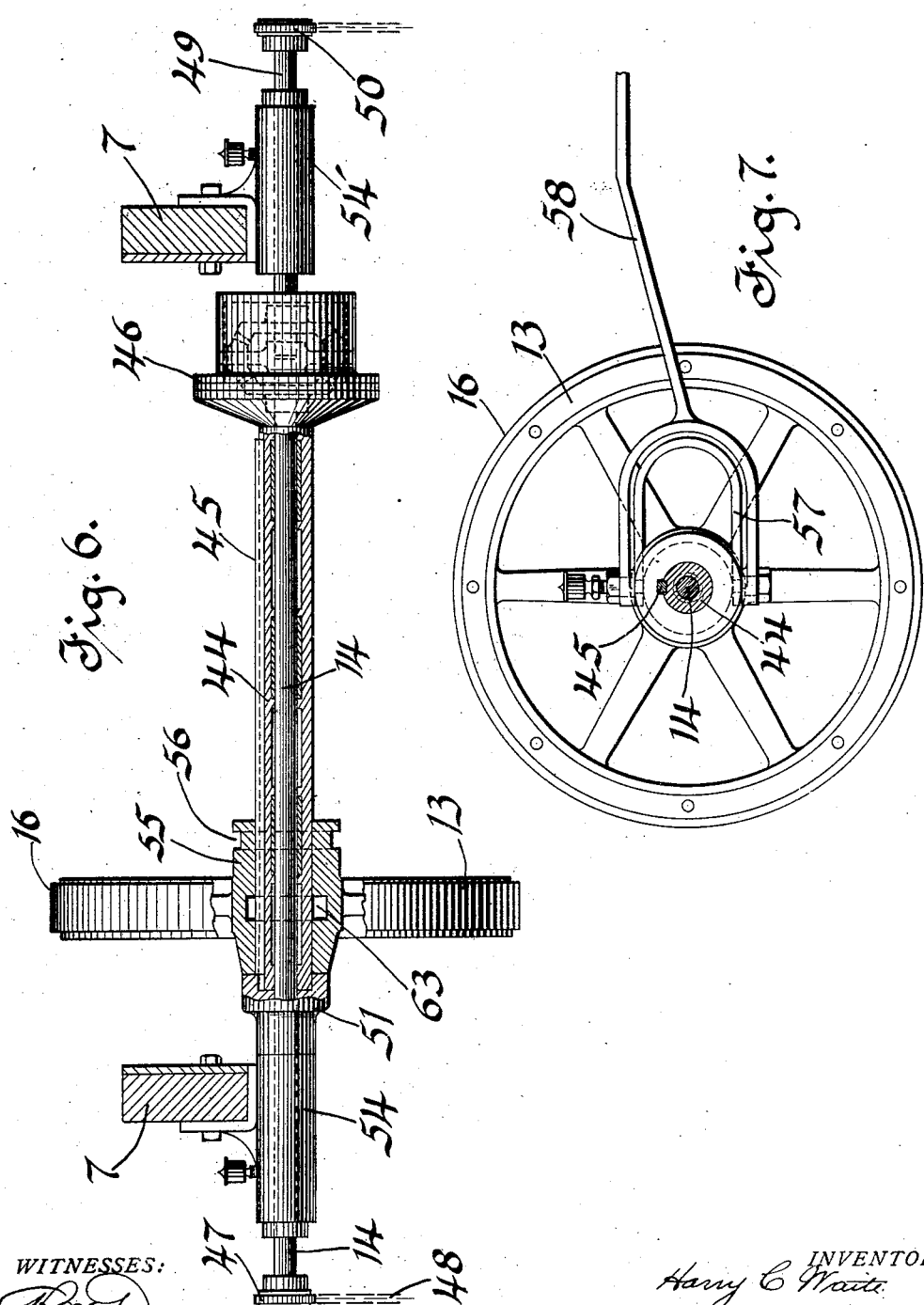

HARRY C. WAITE, OF MILWAUKEE, WISCONSIN, ASSIGNOR OF ONE-HALF TO NIELS A. CHRISTENSEN, OF MILWAUKEE, WISCONSIN.

TRANSMISSION MECHANISM FOR AUTOMOBILES.

No. 912,513.　　Specification of Letters Patent.　　Patented Feb. 16, 1909.

Application filed March 25, 1908. Serial No. 423,166.

*To all whom it may concern:*

Be it known that I, HARRY C. WAITE, a citizen of the United States, and a resident of Milwaukee, in the county of Milwaukee and State of Wisconsin, have made a new and useful Invention in Transmission Mechanism for Automobiles, of which the following is a specification.

This invention relates to automobiles, motor cars and other self-propelled vehicles, but more particularly to the transmission mechanism of such vehicles.

An object of this invention is the production of a friction gearing transmission mechanism in which the elements comprising the friction gearing are yieldingly held in contact and in which means are employed for manually increasing or augmenting the frictional contact between the elements.

A further object is the production of a friction gearing transmission mechanism in which means are employed for manually breaking the frictional or driving contact between the elements comprising the friction gearing.

A further object is the production of a transmission mechanism which is cheap, compact, light and durable and which has a great range of speed, is easily reversed and is noiseless in operation.

These and other objects I attain in a mechanism embodying the features herein described and illustrated in the drawings accompanying this application and forming a part thereof.

In the drawings: Figure 1 is a side elevation, portions being shown in section for convenience of illustration, of a portion of a transmission mechanism embodying my invention; Fig. 2 is a plan view of the apparatus shown in Fig. 1; Fig. 3 is a detail of my invention; Fig. 4 is a partial sectional elevation of a motor car provided with an embodiment of my invention; Fig. 5 is a plan view of the mechanism shown in Fig. 4; Fig. 6 is a partial side elevation and partial section of a detail forming part of my invention; and Fig. 7 is an elevation illustrating means for shifting the friction wheel which forms a part of the mechanism disclosed as embodying my invention.

The transmission mechanism illustrated in the drawings includes, with other elements, a metal friction disk which is driven by the motor or engine of the motor car and contacts with and drives a friction wheel which is provided with a peripherally-mounted fiber contact strip. The friction wheel is adapted to be moved across the face of the friction disk for the purpose of varying the speed of the motor car and also for reversing it. The friction disk is movable axially and is held in contact with the friction wheel by means of an adjusting spring. Means are employed for manually augmenting the frictional and consequently the driving contact between the driving disk and the friction wheel, and means are also employed for moving the friction disk axially away from the friction wheel for the purpose of breaking the driving contact to stop the vehicle, or shift the position of the friction wheel.

Referring particularly to the drawings: A transmission mechanism embodying my invention is shown in Figs. 4 and 5 in connection with the rear portion of the frame 7 of a motor car. The car is provided with a motor or engine (not shown), which, as is customary, is mounted on the front portion of the frame. A driving shaft 8 is directly connected to the shaft of the motor by means of a coupling 9 which permits the shaft 8 to move longitudinally through its bearings while transmitting motion. A main bearing 10 for the shaft is secured to a cross strut 11 of the car frame. An aluminum friction disk 12 is keyed or otherwise suitably secured to the end of the shaft adjacent to the bearing 10 and one of its lateral faces contacts with a friction wheel 13, which is mounted on a jack shaft 14. The shaft 14 extends transversely of the shaft 8 and is parallel to the rear axle of the car on which the driving wheels 15 are mounted. The friction wheel 13 is provided with a peripherally-mounted fiber contact strip 16, against which the driving face of the disk 12 is forced by means of a coil spring 17 which surrounds the shaft 8. The coil spring 17 operates between a sleeve 18 which is loosely mounted on the shaft 8 and a stationary sleeve 19 which is carried by a strut 21 of the car frame and which forms a bearing for the shaft 8. The sleeve 19 is threaded and is secured into a bracket 22 which is secured to the strut 21. By this arrangement the sleeve 19 is adjustable longitudinally of the shaft 8 for the purpose of adjusting the tension of the spring 17. The sleeve 18 is loosely mounted on the shaft 8 between collars 23 and 24, which are keyed or otherwise rigidly mounted on the shaft and a ball thrust bearing 25 is located between the sleeve 18 and the collar 24.

The sleeve 18 is provided on each side with a lug 26 and each lug is connected to one of two levers 27 which are rigidly mounted and fulcrumed on a shaft 28. The shaft 28 is located below the shaft 8 and journaled in brackets 29, which are secured to the struts 11 and 21. A lever 31 is rigidly mounted and fulcrumed on the shaft 28 and is connected by a link 33 to a foot-lever 34 of the second order. The lever 34 is loosely mounted and fulcrumed on a rod 35 which is carried by the frame portion of the car. A lever 36 is rigidly mounted and fulcrumed on the shaft 28 and is connected by means of a link 38 to a foot-lever 39 of the first order, which is loosely mounted and fulcrumed on the rod 35. Both the foot-lever 34 and the lever 39 are provided with foot plates and are adapted to be manually operated by the operator of the car.

The lever 39 is adapted, through the agency of the link 38, the lever 36 and the levers 27, to move the sleeve 18 and consequently the shaft 8 longitudinally in the direction of the pressure of the spring 17 and to thereby augment the driving pressure by forcing the disk 12 against the fiber strip 16 of the friction wheel 13. The lever 34 is adapted, through the agency of the link 33, the lever 31 and the levers 27, to move the sleeve 18 and consequently the shaft 8 in the opposite direction and to break the driving contact between the friction disk and the friction wheel. This motion is opposed by the spring 17 and I have provided a locking device for locking the disk out of contact with the wheel, which comprises a simple foot-lever 41 fulcrumed on the lever 34. The lower end of the lever 41 engages a slot 42 provided in a stationary bracket 43 for a certain position of the lever 34 and is held in place by means of a spring 37 which is mounted on the lever 34. With this construction the foot-lever 34 can be locked in the position which renders the friction disk 12 inoperative with respect to the wheel 13 and can also be released so that the spring 17 will again force the disk 12 in contact with the wheel 13.

The friction wheel 13 is feathered onto a sleeve 44 by means of a key 45 which extends longitudinally of the sleeve. This sleeve 44 surrounds the shaft 14 and is connected at one end to one element of a differential gearing 46 through which the shaft 14 receives power. The shaft 14 is provided at one end with a sprocket wheel 47 which drives one of the driving wheels 15 by means of a chain 48. A short shaft 49 is connected to the differential gearing 46 and is provided at its end with a sprocket wheel 50, connected by means of a chain to the other driving wheel of the car.

The inner face of the sleeve 44 is provided with alternately arranged Babbitt bearing surfaces for the shaft 14 and grease grooves, in which grease is maintained for lubricating the bearing between the sleeve and the shaft.

A collar 51 is loosely mounted on the shaft 14 and is located between the free end of the sleeve 44 and a bearing 54, which is provided for the shaft 14 and which is secured to the frame portion of the motor car. The shaft 49 is journaled in a bearing 54' which is secured to the frame portion of the car.

The hub portion 55 projects laterally and is provided with an annular slot 56 which coöperates with a yoke 57 in moving the wheel 13 along the sleeve 44 and across the face of the disk. The yoke 57 fits into the slot 56 and is pivotally mounted between the prongs of a bifurcated lever 58. The lever 58 is fulcrumed on a bracket 59, secured to the frame portion of the car, and is operated by means of a link 61 and a lever 62, which is secured to the frame portion of the car in a position convenient for the operator of the car. A suitable ratchet is provided for the lever 62 for holding it, and consequently the wheel 13, in desired positions. The lever 62, through the agency of the lever 58, is capable of moving the wheel 13 to different positions relative to the driving face of the disk 12 and to thereby vary the speed of the car or reverse the car. The dot-dash lines in Fig. 5 illustrate the position of the wheel 13 and the lever 58 for reversing.

A grease groove 63 is provided in the hub portion of the wheel 13 for lubricating the bearing between the sleeve 44 and the wheel.

The wheel 13 may be shifted across the driving face of the disk 12 while the car is in motion for varying the speed of the car or reversing it, as has been described. If for any reason it becomes necessary to increase the driving contact between the driving faces of the disk 12 and the wheel 13 for the purpose of eliminating the tendency to slip while transmitting motion, the foot-lever 39 is pushed forward by the operator of the car and additional pressure is transmitted through the shaft 8 and the disk 12 is forced against the periphery of the wheel 13 with greater force than the spring 17 is capable of exerting. When the lever 39 is released by the operator the wheel 13 is relieved of the extraordinary pressure of the disk 12 and is again subjected to the pressure normally exerted by the spring 17.

The foot-lever 34, as described, is utilized for breaking the driving contact between the disk and the wheel and this is accomplished by moving the shaft 8, and, consequently, the disk 12, in a direction which is opposed by the spring 11. By this arrangement the car may be stopped or started by moving the disk 12 axially, and this may be accomplished with little or no noise.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination in a transmission mechanism, a driving disk and a friction wheel in driving contact therewith, means for yieldingly holding said disk in driving contact with said wheel, means supplemental thereto for augmenting the driving contact between said disk and said wheel and means for moving said disk axially to break the driving contact between it and said wheel.

2. In combination in a friction gearing, a driving agent and a driven agent, means for holding said agents in driving contact, means supplemental thereto for augmenting the driving contact between said agents and means for moving said driving agent to break the driving contact.

3. In combination in a friction gearing, a driving agent, a driven agent, a spring for holding said agents in driving contact, manually-operated means, independent of said spring, for augmenting the driving contact and means for breaking the driving contact.

4. In combination in a friction gearing, a driving agent, a driven agent, a spring for yieldingly holding said agents in driving contact, manually-operated means, independent of said spring for augmenting the driving contact between said agents and means for breaking said contact by moving said driving agent axially in opposition to the pressure of said spring.

5. In combination in a friction gearing, a driving agent, a driven agent, a spring for holding said agents in driving contact, means for adjusting the tension of said spring, means, independent of said spring-adjusting means, for augmenting the driving contact between said agents and means for moving one of said agents to break the driving contact.

6. In combination in a friction gearing, a longitudinally movable rotatable shaft, a friction disk carried by said shaft, a friction wheel meshing with said disk and driven thereby, yielding means, operating in conjunction with said shaft, for maintaining the driving contact between said disk and said wheel, a lever, operating in conjunction with said shaft, for augmenting the contact between said disk and said wheel and a second lever for moving said shaft to break the driving contact between said disk and said wheel.

7. In combination in a friction gearing, a longitudinally movable rotatable shaft, a friction disk carried by said shaft, a friction wheel meshing with said disk and driven thereby, yielding means, operating in conjunction with said shaft, for maintaining the driving contact between said disk and said wheel, a lever, operating in conjunction with said shaft, for augmenting the contact between said disk and said wheel, a second lever for moving said shaft to break the driving contact between said disk and said wheel and a locking device, operating in conjunction with said second lever, for holding said shaft in position.

8. In combination in a friction gearing, a driving agent, a driven agent, a spring for holding said agents in driving contact, means for adjusting the tension of said spring, means, independent of said adjusting means, for augmenting the driving contact between said agents, means for moving one of said agents to break said contact and a locking device, operating in conjunction therewith, to hold said agent out of contact.

9. In combination with the driving and driven members of a friction disk gearing, means for shifting the driven member across the face of the driving member, a spring for normally holding the driving member in contact with the face of the driven member and a device for manually increasing the contact between said members by moving the driving member independently of said spring.

10. In combination with the driving and driven members of a friction disk gearing, means for shifting the driven member across the face of the driving member, a spring for normally holding the driven member in contact with the face of the driven member, a device for manually increasing the contact between said members by moving the driving member independently of said spring and means for moving the driving disk out of contact with the driven disk by compressing said spring above normal.

11. In a friction disk gearing, an axially movable driving disk, an axially movable driven disk, the periphery of which normally bears against the face of the driving disk, means for moving said driven disk to vary the effective turning moment of the gearing, a compression spring normally holding said disks in driving contact, means for manually increasing said driving contact independently of said spring and an agent for manually breaking said driving contact; the arrangement being such that said spring tends to restore the gearing to normal position.

12. In combination with the driving and driven members of a friction disk gearing, means for shifting the driven member across the face of the driving member, means for normally holding said driving member in driving ocntact with said driven member, and means supplemental thereto for manually augmenting the driving contact between said members.

13. In combination with the driving and driven members of a friction disk gearing, means for varying the effective turning moment of said gearing, yielding means for maintaining a normal driving pressure between said members, and means supplemental thereto for manually augmenting the driving pressure between said members.

14. In combination with the driving and driven members of a friction disk gearing, means for varying the effective turning moment of said gearing, yielding means for maintaining a normal driving contact between said members, means supplemental thereto for manually augmenting the driving contact between said members, and means for moving one of said members to break the driving contact.

In testimony whereof, I have hereunto subscribed my name this 16th day of March, 1908.

HARRY C. WAITE.

Witnesses:
  G. J. CARROLL,
  FRIEDA FISCHER.